(12) United States Patent
Qiao et al.

(10) Patent No.: US 12,538,168 B2
(45) Date of Patent: Jan. 27, 2026

(54) METHOD AND APPARATUS FOR DROPPING CANDIDATE CHANNELS

(71) Applicant: BEIJING XIAOMI MOBILE SOFTWARE CO., LTD., Beijing (CN)

(72) Inventors: Xuemei Qiao, Beijing (CN); Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 342 days.

(21) Appl. No.: 18/039,764

(22) PCT Filed: Dec. 3, 2020

(86) PCT No.: PCT/CN2020/133659
§ 371 (c)(1),
(2) Date: Jun. 1, 2023

(87) PCT Pub. No.: WO2022/116096
PCT Pub. Date: Jun. 9, 2022

(65) Prior Publication Data
US 2024/0007898 A1  Jan. 4, 2024

(51) Int. Cl.
*H04J 1/16* (2006.01)
*H04W 28/02* (2009.01)

(52) U.S. Cl.
CPC ............... *H04W 28/0289* (2013.01)

(58) Field of Classification Search
CPC .......... H04W 28/0289; H04W 72/0453; H04L 5/0053; H04L 1/0038; Y02D 30/70
(Continued)

(56) References Cited

U.S. PATENT DOCUMENTS

2019/0349911 A1  11/2019  Seo et al.
2020/0374845 A1*  11/2020  Tang ............... H04L 5/0053
(Continued)

FOREIGN PATENT DOCUMENTS

| CN | 109121159 A | 1/2019 |
| CN | 110351010 A | 10/2019 |
| EP | 3742634 A1 | 11/2020 |

OTHER PUBLICATIONS

European Patent Application No. 20963943.4 Search Report dated Mar. 27, 2024, 11 pages.
(Continued)

*Primary Examiner* — Chuong T Ho
(74) *Attorney, Agent, or Firm* — Cozen O'Connor

(57) ABSTRACT

A method for dropping a candidate channel in a wireless communication network includes determining that a limit condition on a blind detection number is satisfied; in which the limit condition includes one of the following: a first blind detection number being greater than a remaining blind detection number; a second blind detection number being greater than a remaining blind detection number; or a third blind detection number being greater than a maximum blind detection number; in which, the search spaces include one or more UE-specific search spaces; and determining not to perform monitoring on one or more candidate channels, in which the one or more candidate channels include a part of channels in the one or more UE-specific search spaces. An apparatus for performing the method is also disclosed.

17 Claims, 10 Drawing Sheets

--- dropping at least part of candidate channels in one or more search spaces and/or stopping detection of at least one control signaling on the at least part of candidate channels, in response to satisfying a limit condition on a blind detection number; in which the limit condition includes: a first blind detection number for a current search space to be blindly detected being greater than a remaining maximum blind detection number; or a second blind detection number for one or more remaining search spaces to be blindly detected being greater than a remaining maximum blind detection number; or a third blind detection number for all search spaces configured on a current time slot being greater than a maximum blind detection number

101

(58) Field of Classification Search
USPC .......................................................... 370/235
See application file for complete search history.

(56) References Cited

U.S. PATENT DOCUMENTS

| | | | |
|---|---|---|---|
| 2022/0109597 A1* | 4/2022 | Takeda | H04L 1/0038 |
| 2022/0110100 A1* | 4/2022 | He | H04W 76/11 |
| 2024/0064763 A1* | 2/2024 | Nunome | H04L 1/0046 |

OTHER PUBLICATIONS

OPPO, "Remaining issues on Search Space", 3GPP TSG RAN WG1 Meeting #92, R1-1802115, Feb. 2018, 4 pages.
PCT/CN2020/133659, English translation of Search Report dated Aug. 30, 2021, 2 pages.

* cited by examiner dropping at least part of candidate channels in one or more search spaces and/ or stopping detection of at least one control signaling on the at least part of candidate channels, in response to satisfying a limit condition on a blind detection number; in which the limit condition includes: a first blind detection number for a current search space to be blindly detected being greater than a remaining maximum blind detection number; or a second blind detection number for one or more remaining search spaces to be blindly detected being greater than a remaining maximum blind detection number; or a third blind detection number for all search spaces configured on a current time slot being greater than a maximum blind detection number   101

FIG. 1 nrofCandidates················································SEQUENCE{
········ aggregationLevel4··································n6
········ aggregationLevel8··································n2
········ aggregationLevel16 ······························ n2
}
dci-Formats·····················································formats0-1-And-1-1

FIG. 2 determining, based on a type of the satisfied limit condition, one or more search spaces from the configured search spaces as one or more candidate search spaces   301 dropping at least part of candidate channels in the one or more candidate search spaces and/or stopping detection of at least one control signaling on the at least part of candidate channels   302

FIG. 3

METHOD AND APPARATUS FOR DROPPING CANDIDATE CHANNELS

CROSS-REFERENCE TO RELATED APPLICATION

This application is a U.S. national phase of International Application No. PCT/CN2020/133659, filed Dec. 3, 2020, the entire content of which is incorporated herein by reference.

TECHNICAL FIELD

The disclosure relates to a field of communication technology, in particular to a method for dropping a candidate channel, and an apparatus for dropping a candidate channel.

BACKGROUND

In some wireless communication systems, a protocol supports that in a time slot (also referred to as Slot), a base station configures, for a user equipment (UE) such as a terminal device, physical downlink control channel (PDCCH) candidates. The PDCCH is primarily used to carry scheduling information to individual UEs, i.e., resource assignments for uplink and downlink data and control information.

SUMMARY

According to a first aspect of embodiments of the present disclosure, a method for dropping a candidate channel is provided. The method is performed by a user equipment and includes: determining that a limit condition on a blind detection number is satisfied; in which the limit condition includes one of the following: a first blind detection number being greater than a remaining blind detection number, in which the first blind detection number is a blind detection number of a next UE-specific search space to be blindly detected; a second blind detection number being greater than a remaining blind detection number, in which the second blind detection number is a blind detection number of one or more remaining UE-specific search spaces to be blindly detected; or a third blind detection number being greater than a maximum blind detection number, in which the third blind detection number is a blind detection number of all search spaces configured on a time slot; in which, the search spaces include one or more UE-specific search spaces; and determining not to perform monitoring on one or more candidate channels, in which the one or more candidate channels include a part of channels in the one or more UE-specific search spaces.

According to a second aspect of embodiments of the disclosure, a user equipment is provided. The UE includes: at least one processor; a memory communicatively connected to the at least one processor; in which the memory stores instructions executable by the at least one processor, the instructions are executed by the at least one processor to cause the at least one processor to perform the method according to the first aspect of embodiments.

According to a third aspect of the disclosure, a non-transitory computer storage medium having computer-executable instructions stored thereon are provided. When computer-executable instructions are executed by a processor, the method according to the first aspect of embodiments or the second aspect of embodiments of the disclosure is implemented.

BRIEF DESCRIPTION OF THE DRAWINGS

These and other aspects and advantages of embodiments of the present disclosure will become apparent and more readily appreciated from the following descriptions made with reference to the drawings, in which:

FIG. 1 is a flowchart of a method for dropping a candidate channel performed by a user equipment according to an embodiment of the disclosure.

FIG. 2 is a schematic diagram of a search space configuration according to an embodiment of the disclosure.

FIG. 3 is a flowchart of a method for dropping a candidate channel according to another embodiment of the disclosure.

DETAILED DESCRIPTION

Figure 4:
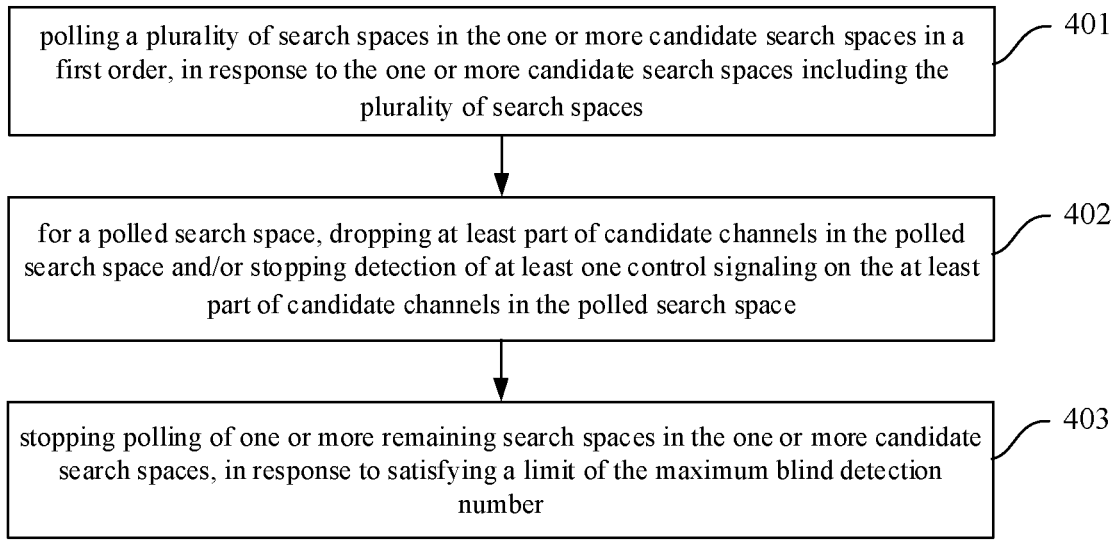
FIG. 4 is a flowchart of a method for dropping a candidate channel according to another embodiment of the disclosure.

Reference will now be made in detail to exemplary embodiments, examples of which are illustrated in the accompanying drawings. The following description refers to the accompanying drawings in which the same or similar numbers in different drawings represent the same or similar elements unless otherwise represented. The embodiments described herein with reference to drawings are explanatory, illustrative, and used to generally understand the present disclosure. The embodiments shall not be construed to limit the disclosure.

It should be noted that, in the related art, a channel dropping strategy is often to drop all candidate channels in all remaining search spaces when the number of PDCCH candidates configured for a terminal device exceeds its maximum blind detection number, so as to realize dropping of one or more candidate channels (also known as PDCCH Candidate Dropping).

When the number of PDCCH candidates configured for the terminal device exceeds its maximum blind detection number, the UE stops detecting all remaining search spaces, that is, drops all candidate channels in all the remaining search spaces. In this case, the granularity of dropping the candidate channels is too coarse. In this way, unnecessary dropping of PDCCH candidates may occur, which will lead to unnecessary PDCCH blocking. Therefore, how to avoid the unnecessary dropping of PDCCH candidates and unnecessary PDCCH blocking has become one of the important research directions.

For example, a base station configures 8 search spaces for user equipment (UE) such as a terminal device. When the blind detection reaches the sixth search space, the remaining maximum blind detection number for the terminal device is 6, and the base station configures 8 candidate channels for the sixth search space. In this case, according to some channel dropping strategies, the terminal device will no longer perform blind detection on the sixth, seventh, and eighth search spaces.

In this way, unnecessary dropping of PDCCH candidates may occur, which will lead to unnecessary PDCCH blocking. In particular, for a reduced capability UE (RedCap UE) with a low maximum blind detection number, the maximum blind detection number needs to be reduced in order to save energy. For example, the maximum blind detection number for the terminal specified in an original protocol is reduced from 44 to 22. In this way, a probability of PDCCH blocking is bound to be greatly increased. Therefore, the method for dropping a candidate channel proposed in the disclosure no longer adopts the channel dropping strategy of dropping all candidate channels in all the remaining search spaces when the number of PDCCH candidates configured for the terminal device exceeds its maximum blind detection number. At least part of candidate channels in one or more search spaces are dropped and/or detection of at least one control signaling on the at least part of candidate channels is stopped in response to satisfying a limit condition on a blind detection number, thus avoiding unnecessary dropping of PDCCH candidates and unnecessary PDCCH blocking, and improving a flexibility in a process of dropping one or more candidate channels.

FIG. 1 is a flowchart of a method for dropping a candidate channel provided in an embodiment of the disclosure. As illustrated in FIG. 1, the method is performed by a user equipment (UE). The method for dropping a candidate channel includes the followings.

At step 101, in response to satisfying a limit condition on a blind detection number, at least part of candidate channels in one or more search spaces are dropped and/or detection of at least one control signaling on the at least part of candidate channels is stopped. The limit condition includes a first blind detection number for a current search space to be blindly detected being greater than a remaining maximum blind detection number; or a second blind detection number for one or more remaining search spaces to be blindly detected being greater than a remaining maximum blind detection number; or a third blind detection number for all search spaces configured on a current time slot being greater than a maximum blind detection number.

It should be noted that the UE may be a RedCap UE or a normal UE.

In some embodiments of the present disclosure, the candidate channel may be a physical downlink control channel candidate (PDCCH candidate). The control signaling may be a downlink control information (DCI) signaling. DCI refers to downlink control information carried by the PDCCH and sent to the UE by a network device such as a base station. It should be noted that a format of the DCI signaling is not limited in the disclosure, and can be selected according to actual situations. For example, the format of the DCI signaling may be DCI format 0_1, DCI format 0_2, DCI format 1_1, DCI format 1_2, DCI format 2_3 or the like.

In some embodiments of the disclosure, the current search space to be blindly detected may be a search space on which the terminal device currently performs blind detection. The remaining search spaces to be blindly detected may be search spaces on which the blind detection has not been performed in the search spaces configured for the terminal device.

In some embodiments of the disclosure, in response to satisfying the limit condition on the blind detection number, optionally, at least part of candidate channels in one or more search spaces may be dropped; optionally, detection of at least one control signaling on the at least part of candidate channels may be stopped. Optionally, at least part of candidate channels in one or more search spaces may be dropped and detection of at least one control signaling on the at least part of candidate channels may be stopped.

For example, the remaining maximum blind detection number is 14, and the current search space configuration is shown in FIG. 2, which can support three aggregation levels, i.e., AL=4, AL=8 and AL=16. Correspondingly, the numbers of candidate channels is n6 (i.e., six candidate channels), n2 (i.e., two candidate channels) and n2 respectively, and there are two formats of the DCI signaling: DCI format 0_1 and DCI format 1_1.

In this case, the first blind detection number in the current search space to be blindly detected is (6+2+2)*2=20, which is greater than the remaining maximum blind detection number 14, i.e., the limit condition is satisfied. The channel dropping strategy can be one of the followings, but is not limited to the followings.

(1) In response to satisfying the limit condition on the blind detection number, at least part of candidate channels in one or more search spaces may be dropped, that is, all or a part of the candidate channels in the one or more search space may be dropped.

Optionally, all 6 PDCCH candidates for AL=4 may be dropped in response to satisfying the limit condition. In this case, the first blind detection number is (2+2)*2=8, which is not greater than the remaining maximum blind detection number 14, i.e., the limit condition is not satisfied and there is no need to continue dropping the candidate channel. In this case, unnecessary dropping of two candidate channels for AL=8 and two candidate channels for AL=16 and thus unnecessary PDCCH blocking can be avoided.

Optionally, 3 PDCCH candidates for AL=4 may be dropped in response to satisfying the limit condition. In this case, the first blind detection number is (3+2+2)*2=14, which is not greater than the remaining maximum blind detection number 14, i.e., the limit condition is not satisfied and there is no need to continue dropping the candidate channel. In this case, unnecessary dropping of the remaining 3 candidate channels for AL=4, the two candidate channels for AL=8, and the two candidate channels for AL=16 and thus unnecessary PDCCH blocking can be avoided.

(2) In response to satisfying the limit condition on the blind detection number, detection of at least one control signaling on at least part of candidate channels may be stopped, that is, detection of at least one control signaling on all candidate channels may be stopped, or detection of at least one control signaling on at least part of candidate channels may be stopped.

Optionally, in response to satisfying the limit condition, detection of DCI format 1_1 for AL=4 may be stopped. In this case, the first blind detection number is 6*1+2*2+2*2=14, which is not greater than the remaining maximum blind detection number 14, i.e., the limit condition is not satisfied and there is no need to continue dropping the candidate channel. In this case, unnecessary dropping of DCI format 0_1 for AL=4, the two candidate channels for AL=8, and the two candidate channels for AL=16 and thus unnecessary PDCCH blocking can be avoided.

Optionally, in response to satisfying the limit condition, detection of DCI format 1_1 on the aforementioned three candidate channels for AL=4, AL=8 and AL=16 may be stopped. In this case, the first blind detection number is 10, which is not greater than the remaining maximum blind detection number 14, i.e., the limit condition is not satisfied and there is no need to continue dropping the candidate channel. In this case, unnecessary dropping of DCI format 0_1 for AL=4, AL=8 and AL=16 and thus unnecessary PDCCH blocking can be avoided.

(3) In response to satisfying the limit condition on the blind detection number, at least part of candidate channels in one or more search spaces may be dropped and detection of at least one control signaling on the at least part of candidate channels may be stopped.

Optionally, in response to satisfying the limit condition, 3 PDCCH candidates for AL=4 may be dropped, and detection of DCI format 1_1 on the remaining candidate channels for AL=4 may be stopped. In this case, the first blind detection number is 3*1+2*2+2*2=11, which is not greater than the remaining maximum blind detection number 14, i.e., the limit condition is not satisfied and there is no need to continue dropping the candidate channel. In this case, unnecessary dropping of DCI format 0_1 on the three remaining candidate channels for AL=4, and the two candidate channels for AL=8 and AL=16 and thus unnecessary PDCCH blocking can be avoided.

It should be noted that, in some embodiments of the disclosure, a resource granularity of the PDCCH is a control channel element (CCE), that is, CCE is a basic unit constituting the PDCCH. One CCE occupies 6 REGs (Resource Element Group) in a frequency domain. One given PDCCH can be composed of 1, 2, 4, 8 or 16 CCEs. A specific value of the number of CCEs is determined by a DCI load size and a required encoding rate. The number of CCEs constituting the PDCCH is referred to as AL. For example, for a New Radio (NR) mechanism, five ALs such as 1, 2, 4, 8, and 16 can be supported. Of course, these AL configuration parameters are only illustrative, and do not limit a protection scope of the disclosure.

According to a method for dropping a candidate channel provided in the embodiment of the disclosure, the user equipment can drop at least part of candidate channels in one or more search spaces and/or stop detection of at least one control signaling on the at least part of candidate channels in response to satisfying a limit condition on a blind detection number. The limit condition includes: a first blind detection number for a current search space to be blindly detected being greater than a remaining maximum blind detection number; or a second blind detection number for one or more remaining search spaces to be blindly detected being greater than a remaining maximum blind detection number; or a third blind detection number for all search spaces configured on a current time slot being greater than a maximum blind detection number. In this way, dropping of one or more candidate channels may be realized, and a channel dropping strategy of dropping all candidate channels in all remaining search spaces when the number of PDCCH candidates configured for the terminal device exceeds its maximum blind detection number is no longer used, thus avoiding unnecessary dropping of PDCCH candidates and unnecessary PDCCH blocking, and improving a flexibility in a process of dropping one or more candidate channels.

FIG. 3 is a flowchart of a method for dropping a candidate channel provided in an embodiment of the disclosure. The method is performed by a user equipment (UE). In response to satisfying a limit condition on a blind detection number, one or more candidate search spaces are determined, and at least part of candidate channels in the one or more candidate search spaces are dropped and/or detection of at least one control signaling on the at least part of candidate channels is stopped.

As a possible implementation manner, as illustrated in FIG. 3, on the basis of the foregoing embodiment, the above step of dropping the at least part of candidate channels in the one or more search spaces and/or stopping the at least one control signaling on the at least part of candidate channels includes the following.

At step 301, based on a type of the satisfied limit condition, one or more search spaces are determined from the configured search spaces as one or more candidate search spaces.

In some embodiments of the disclosure, the type of the limit condition may include the first blind detection number being greater than the remaining maximum blind detection number, the second blind detection number being greater than the remaining maximum blind detection number, and the third blind detection number being greater than the maximum blind detection number.

In this case, the way of determining one or more search spaces from the configured search spaces according to the type of the satisfied limit condition as the one or more candidate search spaces may be one of the followings, but is not limited to the followings.

(1) In response to the satisfied limit condition indicating that the first blind detection number is greater than the remaining maximum blind detection number, one or more search spaces are determined from the configured search spaces as the one or more candidate search spaces.

(2) In response to the satisfied limit condition indicating that the second blind detection number is greater than the remaining maximum blind detection number, one or more search spaces are determined from the configured search spaces as the one or more candidate search spaces.

(3) In response to the satisfied limit condition indicating that the third blind detection number is greater than the maximum blind detection number, one or more search spaces are determined from the configured search spaces as the one or more candidate search spaces.

At step 302, at least part of candidate channels in the one or more candidate search spaces are dropped and/or detection of at least one control signaling on the at least part of candidate channels is stopped.

In some embodiments of the disclosure, the at least part of candidate channels includes a first number of candidate channels, and different candidate search spaces correspond to the same or different first numbers.

In this case, the method of dropping a candidate channel in the channel dropping strategy can be one of the followings, but is not limited to the followings.

(1) At least part of candidate channels in the one or more candidate search spaces are dropped.

Optionally, all or a part of candidate channels in one candidate search space may be dropped. Optionally, all or a part of candidate channels in multiple candidate search spaces may be dropped.

(2) Detection of at least one control signaling on the at least part of the candidate channels is stopped.

Optionally, detection of at least one control signaling on all candidate channels may be stopped. Optionally, detection of at least one control signaling on at least part of candidate channels may be stopped.

(3) At least part of candidate channels in the one or more candidate search spaces are dropped and detection of at least one control signaling on at least part of the candidate channels is stopped.

Optionally, all candidate channels or some candidate channels in one candidate search space may be dropped, and detection of at least one control signaling on all candidate channels or some candidate channels may be stopped. Optionally, all candidate channels or some candidate channels in multiple candidate search spaces may be dropped, and detection of at least one control signaling on all candidate channels or some candidate channels may be stopped.

It should be noted that, in some embodiments of the disclosure, when the type of the satisfied limit condition indicates that the second blind detection number is greater than the remaining maximum blind detection number and the third blind detection number is greater than the maximum blind detection number, polling may be performed on multiple search spaces in the one or more candidate search spaces.

As a possible implementation manner, as illustrated in FIG. 4, the method specifically includes the following.

At step 401, in response to the one or more candidate search spaces including a plurality of search spaces, the plurality of search spaces in the one or more candidate search spaces are polled in a first order.

Figure 5:
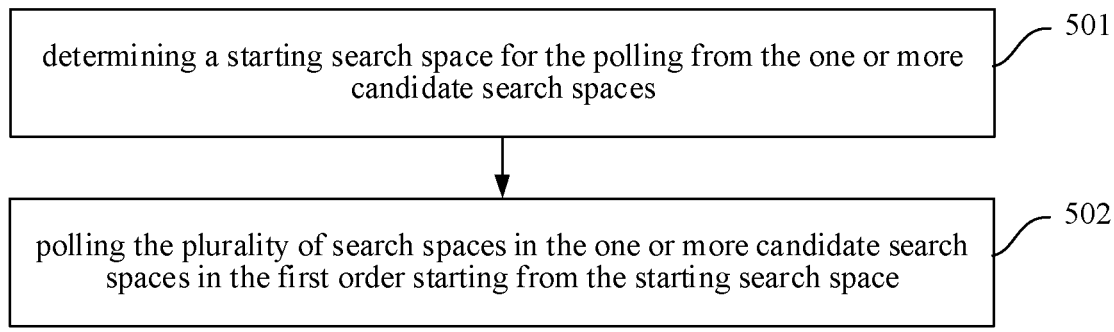
FIG. 5 is a flowchart of a method for dropping a candidate channel according to another embodiment of the disclosure.

As a possible implementation manner, as illustrated in FIG. 5, the polling specifically includes the followings.

At step 501, a starting search space for the polling is determined from the one or more candidate search spaces.

For example, there are eight candidate search spaces in total. The starting search space may be determined as any search space in the first to eighth candidate search spaces.

At step 502, the search spaces in the one or more candidate search spaces are polled in a first order starting from the starting search space.

In some embodiments of the disclosure, the first order may include an order of serial numbers of search spaces in the one or more candidate search spaces or an order of levels of the search spaces.

In some embodiments of the disclosure, the starting search space is one of the followings: a search space with a level satisfying a preset condition; or; a configured first UE-specific search space (USS); or a configured first search space.

For example, if there are 8 candidate search spaces in total, and the starting search space is the configured first USS, the search spaces in the one or more candidate search spaces can be polled starting from the starting search space in the order of the serial numbers of the search spaces in the one or more candidate search space.

At step 402, for a polled search space, at least part of candidate channels in the polled search space are dropped and/or detection of at least one control signaling on the at least part of candidate channels in the polled search space is stopped.

For example, there are 8 candidate search spaces in total, and the sixth search space is currently polled. In this case, at least part of candidate channels in the sixth search space can be dropped, and/or detection of at least one control signaling on at least part of candidate channels in the sixth search space can be stopped.

At step 403, in response to satisfying a limit of the maximum blind detection number, polling of one or more remaining search spaces in the one or more candidate search spaces is stopped.

For example, there are seven search spaces in total, and the limit of the maximum blind detection number is satisfied if polling reaches the sixth search space. In this case, in response to satisfying the limit of the maximum blind detection number, polling of the sixth to seventh search spaces can be stopped.

In some embodiments of the disclosure, for the polled candidate search space, at least part of candidate channels may be dropped, and/or detection of at least one control signaling on the at least part of candidate channels may be stopped. For example, if there are seven search spaces in total, the first order is the order of serial number 1 to 7 of the search spaces in the one or more candidate search spaces, and the starting search space is the fifth search space with the level satisfying the preset condition. In this case, in response to the candidate search space including multiple search spaces, starting from the fifth search space, a given number of candidate channels are dropped according to the serial numbers of the search spaces, in which 2 candidate channels in each search space are dropped until dropping of one or more candidate channels in the sixth search space is completed, and then the requirement of the maximum blind detection number is satisfied, and dropping of one or more candidate channels in the seventh search space can be stopped, that is, a normal blind detection is performed.

For another example, if there are seven search spaces in total, the first order is the order of serial number 1 to 7 of the search spaces in the one or more candidate search spaces, the starting search space is the configured first USS, and the second candidate search space is the first USS. In this case, in order to ensure that the configured common search space (CSS) is not dropped, in response to the one or more candidate search spaces including multiple search spaces, starting from the second search space, a given number of candidate channels are dropped according to the serial numbers of the search spaces, in which 2 candidate channels in each search space are dropped until dropping of one or more candidate channels in the sixth search space is completed, and then the requirement of the maximum blind detection number is satisfied, and dropping of one or more candidate channels in the seventh search space can be stopped, that is, a normal blind detection is performed.

For a further example, if there are seven search spaces in total, the first order is the order of serial number 1 to 7 of the search spaces in the one or more candidate search spaces, the starting search space is the configured first search space, and the first candidate search space is the first search space. In this case, regardless of whether the first search space is a CSS or a USS, in response to the one or more candidate search spaces including multiple search spaces, starting from the first search space, a given number of candidate channels are dropped according to the serial numbers of the search spaces, in which 2 candidate channels in each search space are dropped until dropping of one or more candidate channels in the sixth search space is completed, and then the requirement of the maximum blind detection number is satisfied, and dropping of one or more candidate channels in the seventh search space can be stopped, that is, a normal blind detection is performed.

In some embodiments of the disclosure, in response to the one or more candidate search spaces including a plurality of search spaces, for each of the one or more candidate search spaces, at least part of candidate channels are dropped, and/or detection of at least one control signaling on the at least part of candidate channels is stopped.

For example, if a total of seven search spaces are configured for the UE, three search spaces can be determined from the seven search spaces as candidate search spaces. For example, the serial numbers of the search spaces are 1 to 7, among which search space 5 to search space 7 are determined as candidate search spaces, then starting from search space 5 (the fifth search space), a given number of candidate channels are dropped for search space 6 and search space 7 respectively, in which two candidate channels in each search space are dropped until the dropping is completed, and then the requirement of the maximum blind detection number is satisfied.

Optionally, in a process of dropping at least part of candidate channels for each search space in the one or more candidate search spaces, the requirement of the maximum blind detection number may be satisfied once only one candidate channel is dropped for the sixth search space, and then dropping of one or more candidate channels in the seventh search space may be stopped, that is, a normal blind detection is performed.

According to a method for dropping a candidate channel provided in the embodiment of the disclosure, in response to satisfying the limit condition on the blind detection number, the user equipment can determine, according to the type of the satisfied limit condition, one or more search spaces from the configured search spaces as one or more candidate search spaces, and drops at least part of candidate channels in the one or more candidate search spaces and/or stop detection of at least one control signaling on the at least part of candidate channels, so as to realize dropping of the candidate channel.

In the following, the specific process of determining one or more search spaces from the configured search spaces as the one or more candidate search spaces may be described respectively for different types of the satisfied limit condition on the blind detection number.

For the type of the satisfied limit condition indicating that the first blind detection number is greater than the remaining maximum blind detection number, optionally, in response to the satisfied limit condition indicating that the first blind detection number is greater than the remaining maximum blind detection number, the current search space can be determined as the candidate search space.

For the type of the satisfied limit condition indicating that the second blind detection number is greater than the remaining maximum blind detection number, optionally, in response to the satisfied limit condition indicating that the second blind detection number is greater than the remaining maximum blind detection number, the current search space and at least part of subsequent search spaces can be determined as the candidate search spaces.

For the type of the satisfied limit condition indicating that the third blind detection number is greater than the maximum blind detection number, optionally, in response to the satisfied limit condition indicating that the third blind detection number is greater than the maximum blind detection number, at least part of USSs configured on the current time slot can be determined as the one or more candidate search space. Optionally, in response to the satisfied limit condition indicating that the third blind detection number is greater than the maximum blind detection number, all search spaces configured on the current time slot can be determined as the one or more candidate search space.

Further, after the one or more candidate search spaces are determined, optionally, based on an aggregation level, at least part of candidate channels in the one or more candidate search spaces may be dropped, and/or detection of at least one control signaling on the at least part of candidate channels in the one or more candidate search spaces may be stopped. Optionally, for each of aggregation levels of the one or more candidate search spaces, at least part of candidate channels are dropped, and/or detection of at least one control signaling on the at least part of candidate channels is stopped.

It should be noted that, in some embodiments of the disclosure, the at least part of candidate channels includes a second number of candidate channels, in which different aggregation levels correspond to the same or different second numbers.

For different types of the satisfied limit condition, one or more search spaces may be determined from the configured search spaces as the one or more candidate search spaces, and then at least part of candidate channels may be dropped from the one or more candidate search spaces and/or detection of at least one control signaling on the at least part of candidate channels in the one or more candidate search spaces is stopped. In the following, a process of determining one or more candidate channels that need to be dropped or one or more candidate channels whose detection needs to be stopped within the one or more candidate search spaces will be explained.

As a possible implementation manner, at least part of candidate channels in the one or more candidate search spaces may be dropped and/or detection of at least one control signaling on the at least part of candidate channels in the one or more candidate search spaces may be stopped according to the aggregation level.

Optionally, one or more candidate channels can be dropped according to the target AL.

Figure 6:
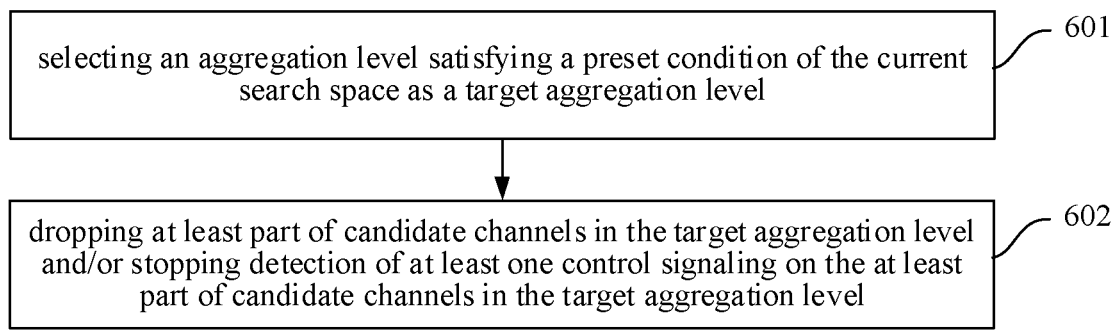
FIG. 6 is a flowchart of a method for dropping a candidate channel according to another embodiment of the disclosure.

As a possible implementation, as illustrated in FIG. 6, the method specifically includes the followings.

At step 601, an aggregation level satisfying a preset condition of a current search space is selected as a target aggregation level.

Optionally, the AL satisfying the preset condition of the current search space may be an AL lower than a preset AL. For example, the preset AL may be set to AL=8. In this case, the target AL may include a total of 3 ALs, i.e., AL=1, AL=2 and AL=4. The preset condition may be another condition. For example, the AL satisfying the preset condition can be the lowest two ALs and the highest one AL, in this case, the target AL can include a total of 3 ALs, i.e., AL=1, AL=2 and AL=16.

At step 602, at least part of candidate channels in the target aggregation level are dropped and/or detection of at least one control signaling on the at least part of candidate channels in the target aggregation level is stopped.

In this case, a method of dropping a candidate channel in the channel dropping strategy may be one of the followings, but is not limited to the following.

(1) All candidate channels in the target aggregation level are dropped.

For example, the target AL is AL=4, in this case, all candidate channels for AL=4 can be dropped.

(2) At least part of candidate channels that exceed the maximum blind detection number in the target aggregation level are dropped.

For example, the target AL is AL=4, and for AL=4, only 3 candidate channels exceed the maximum blind detection number. In this case, the 3 candidate channels can be dropped for AL=4.

(3) Detection of at least one control signaling on the at least part of candidate channels in the target aggregation level is stopped.

For example, if the target AL is AL=4, and the search space is configured with four types of DCI signaling, i.e., DCI format 0_0, DCI format 0_1, DCI format 1_0 and DCI format 1_1, then detection of DCI format 0_0 and DCI format 1_0 on the target aggregation level is stopped.

It should be noted that, the at least part of candidate channels includes the second number of candidate channels, different aggregation levels correspond to the same or different second numbers. In this case, for different target ALs, the number of dropped candidate channels and the number of detections of at least one control signaling on the at least part of candidate channels that are stopped may be the same or different.

For example, when trying to stop detecting at least one control signaling on at least part of candidate channels in the target aggregation level, if the target AL is AL=4, at least one control signaling on three candidate channels in the aggregation level AL=4 can be dropped; if the target AL is AL=8, at least one control signaling on one candidate channel in the aggregation level AL=8 can be dropped.

In some embodiments of the disclosure, the target AL may be further compared with the preset AL to determine a matched channel dropping manner.

Optionally, in response to the target aggregation level being lower than a first preset aggregation level, detection of at least one control signaling carrying bits the number of which is greater than a preset bit number on the at least part of candidate channels in the target aggregation level may be stopped.

For example, the target AL is AL=2, the first preset aggregation level is AL=8, and the number of bits carried by the DCI signaling in a non-fallback format is greater than the preset bit number. In this case, in response to the target aggregation level being smaller than the first preset aggregation level, detection of the DCI signaling in the non-fallback format on the at least part of candidate channels in the target aggregation level AL=2 is stopped.

Optionally, in response to the target aggregation level being greater than a second preset aggregation level, detection of at least one control signaling carrying bits the number of which is less than or equal to the preset bit number on the at least part of candidate channels in the target aggregation level may be stopped.

For example, the target AL is AL=16, the second preset aggregation level is AL=8, and the number of bits carried by the DCI signaling in a fallback format is less than or equal to the preset bit number. In this case, in response to the target aggregation level being greater than the second preset aggregation level, detection of the DCI signaling in the fallback format on the at least part of candidate channels in the target aggregation level AL=16 is stopped.

In some embodiments of the disclosure, a matched channel dropping manner may be determined for different device types of the UE.

Optionally, detection of at least one downlink DCI control signaling on the at least part of candidate channels in the target aggregation level may be stopped in response to the UE being a type of a device mainly responsible for uplink businesses.

For example, the target aggregation level is AL=4, and the UE is a type of a device mainly responsible for uplink businesses. In this case, in response to the UE being the type of the device mainly responsible for uplink businesses, detection of the downlink DCI signaling on at least part of candidate channels in the target aggregation level AL=4 can be stopped.

Optionally, detection of at least one uplink DCI control signaling on the at least part of candidate channels in the target aggregation level may be stopped in response to the UE being a type of a device mainly responsible for downlink businesses.

For example, the target aggregation level is AL=4, and the UE is a type of a device mainly responsible for downlink businesses. In this case, in response to the UE being the type of the device mainly responsible for downlink businesses, detection of the uplink DCI signaling on at least part of candidate channels in the target aggregation level AL=4 can be stopped.

Figure 7:
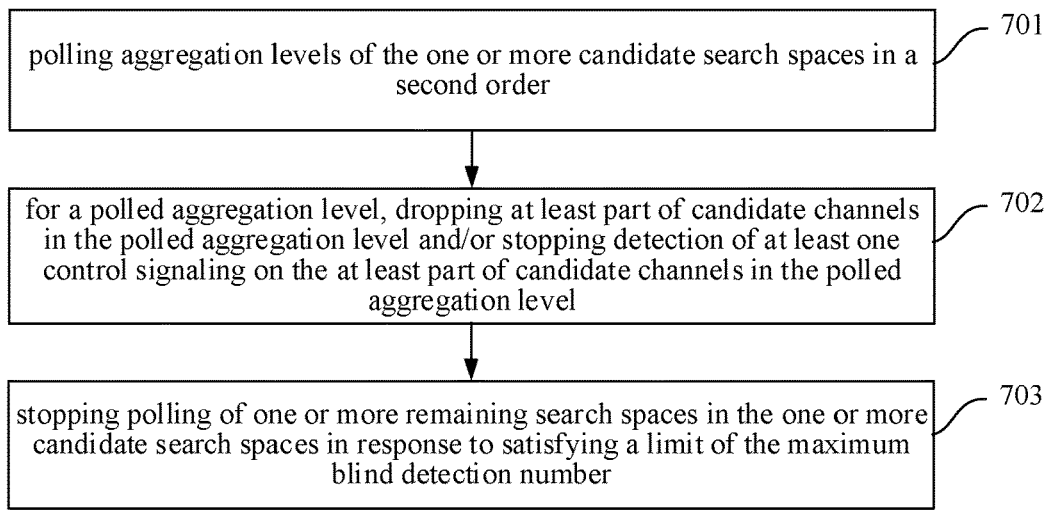
FIG. 7 is a flowchart of a method for dropping a candidate channel according to another embodiment of the disclosure.

As a possible implementation, as illustrated in FIG. 7, the method specifically includes the followings.

At step 701, aggregation levels of the one or more candidate search spaces are polled in a second order.

In some embodiments, the second order may be an order from the lowest level AL to the highest level AL. For example, the search space is configured to support AL=4, AL=8 and AL=16. In this case, the aggregation levels of the one or more candidate search spaces can be polled in an order from AL=4 to AL=8 and then to AL=16.

At step 702, for a polled aggregation level, at least part of candidate channels in the polled aggregation level are dropped and/or detection of at least one control signaling on the at least part of candidate channels in the polled aggregation level is stopped.

For example, the AL currently polled is AL=4, the requirement of the maximum blind detection number can be satisfied if detection of the DCI format 0_1 on the aggregation level AL=4 is stopped. In this case, detection of the DCI format 0_1 on the aggregation level AL=4 can be stopped.

For another example, the AL currently polled is AL=4, the requirement of the maximum blind detection number can be satisfied only if detection of all candidate channels on the aggregation level AL=4 is stopped. In this case, detection of all candidate channels on the aggregation level AL=4 can be stopped.

For a further example, the AL currently polled is AL=4, the requirement of the maximum blind detection number can be satisfied if detection of the DCI signaling in the fallback format on at least part of candidate channels on the aggregation level AL=4 is stopped. In this case, detection of the DCI signaling in the fallback format on at least part of candidate channels on the aggregation level AL=4 can be stopped.

At step 703, in response to satisfying a limit of the maximum blind detection number, polling of one or more remaining search spaces in the one or more candidate search spaces is stopped.

For example, a base station is configured with 7 search spaces, and the current search space is the fifth search space. In this case, in response to satisfying the limit of the maximum blind detection number, polling of the sixth to seventh candidate search spaces can be stopped.

It should be noted that, in some embodiments of the disclosure, the second order may be Out-of-Order. For example, the search space is configured to support AL=4, AL=8 and AL=16. In this case, polling of the aggregation levels of the one or more candidate search spaces can be performed in the order from AL=4 to AL=16 and then to AL=8.

Further, for the polled aggregation level, at least part of candidate channels in the polled aggregation level may be dropped and/or detection of at least one control signaling on the at least part of candidate channels in the polled aggregation level may be stopped. For example, if the currently polled AL is AL=16, the requirement of the maximum blind detection number can be satisfied if detection of DCI format 0_1 on the polled aggregation level AL=16 is stopped. In this case, detection of the DCI format 0_1 on the polled aggregation level AL=16 can be stopped.

Further, in response to satisfying the limit of the maximum blind detection number, polling of the remaining search spaces in the one or more candidate search spaces may be stopped.

As another possible implementation manner, for each of aggregation levels of the one or more candidate search spaces, at least part of candidate channels may be dropped and/or detection of at least one control signaling on the at least part of candidate channels may be stopped.

It should be noted that, the at least part of candidate channels includes the second number of candidate channels, and different aggregation levels correspond to the same or different second numbers. In this case, for different ALs, the number of dropped candidate channels and the number of detections of at least one control signaling on the at least part of candidate channels that are stopped may be the same or different.

For example, the search space is configured to support AL=4, AL=8 and AL=16. For each of AL=4, AL=8 and AL=16 of the candidate search space, two candidate channels can be dropped and/or detection of at least one control signaling on the two candidate channels can be stopped. It is also possible to drop two candidate channels for AL=4, one candidate channel for AL=8, and one candidate channel for AL=16 of the candidate search space.

Further, the candidate channels in the AL may be numbered in advance, and then according to the serial numbers of the candidate channels in the AL, the second number of candidate channels are selected and dropped according to an order of the serial numbers of the candidate channels.

For example, the search space is configured to support AL=4, AL=8, and AL=16, and the candidate channels in the aforementioned three ALs are numbered as follows: the six candidate channels in the aggregation level AL=4 are numbered as 0 to 5 respectively; the six candidate channels in the aggregation level AL=8 are numbered as 0 to 5 respectively; the six candidate channels in the aggregation level AL=16 are numbered as 0 to 5 respectively. In this case, two candidate channels numbered 4 and 5 in the aggregation level AL=4 can be dropped; two candidate channels numbered 0 and 1 in the aggregation level AL=8 can be dropped; and two candidate channels numbered 0 and 2 in the aggregation level AL=16 can be dropped.

It should be noted that, in some embodiments of the disclosure, for the search spaces, the number of dropped candidate channels in a CSS is smaller than the number of dropped candidate channels in a USS and/or detection of the control signaling on the candidate channels in the USS is stopped, to ensure that the configured CSS is not dropped.

For example, if the number of dropped candidate channels in the CSS is 1, and the number of dropped candidate channels in the USS is 6, in this case, if the blind detection of some DCI signaling is stopped, merely detection of the control signaling on candidate channels in the USS can be stopped.

Figure 8:
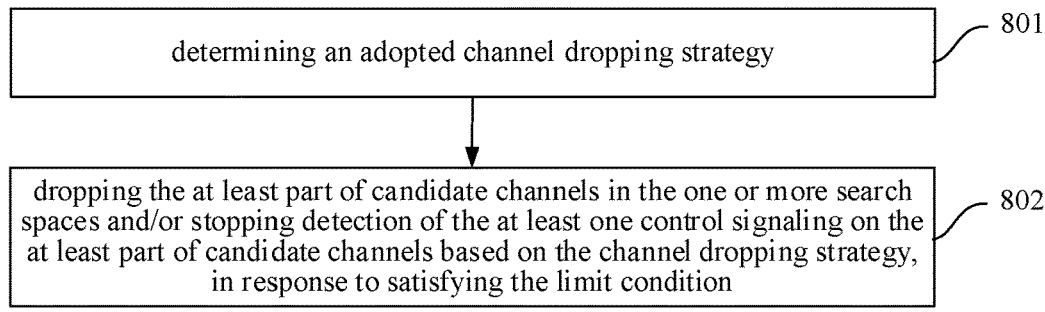
FIG. 8 is a flowchart of a method for dropping a candidate channel according to another embodiment of the disclosure.

FIG. 8 is a flowchart of a method for dropping a candidate channel according to another embodiment of the disclosure. The method is performed by the UE. In response to satisfying a limit condition on a blind detection number, an adopted channel dropping strategy is determined, and then at least part of candidate channels in one or more candidate search spaces are dropped and/or detection of at least one control signaling on the at least part of candidate channels is stopped.

As a possible implementation, as illustrated in FIG. 8, on the basis of the foregoing embodiment, the method specifically includes the followings.

At step 801, an adopted channel dropping strategy is determined.

Optionally, strategy indication information from a network device may be received, and the channel dropping strategy may be determined according to the strategy indication information. Optionally, the channel dropping strategy adopted by the UE is at least one of pre-appointed candidate channel dropping strategies.

It should be noted that, with regard to specific content of the channel dropping strategy, reference can be made to the foregoing description, which will not be repeated here.

At step 802, in response to satisfying a limit condition on a blind detection number, at least part of candidate channels in one or more search spaces are dropped and/or detection of at least one control signaling on the at least part of candidate channels is stopped based on the channel dropping strategy.

It should be noted that, with regard to specific content of dropping based on the channel dropping strategy, reference can be made to the foregoing description, which will not be repeated here.

It should be noted that, if there are multiple channel dropping strategies, a usage order of the multiple channel dropping strategies may be determined in response to the multiple channel dropping strategies existing. In some embodiments of the disclosure, the usage order is determined based on a priority of each channel dropping strategy and/or an effective time of each channel dropping strategy.

According to a method for dropping a candidate channel provided in the embodiment of the disclosure, the user equipment can determine the adopted channel dropping strategy, and drop at least part of candidate channels in one or more search spaces and/or stop detection of at least one control signaling on the at least part of candidate channels based on the channel dropping strategy in response to satisfying a limit condition on a blind detection number, so as to realize dropping of the candidate channel, thus avoiding unnecessary dropping of PDCCH candidates and unnecessary PDCCH blocking, and improving a flexibility in a process of dropping the candidate channel.

Figure 9:
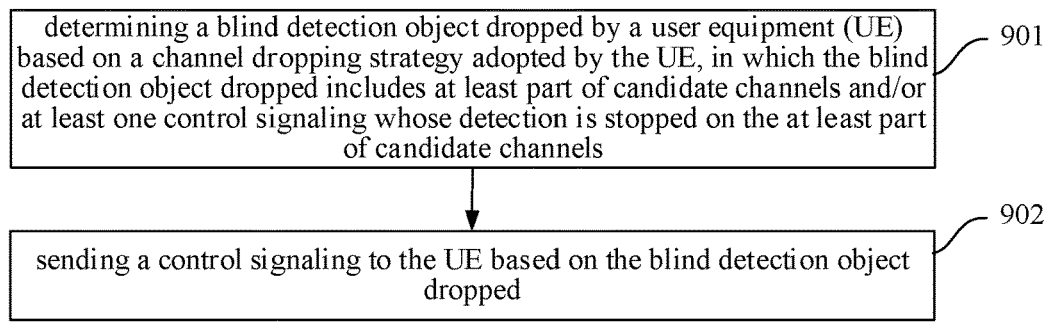
FIG. 9 is a flowchart of a method for dropping a candidate channel performed by a network device according to another embodiment of the disclosure.

FIG. 9 is a flowchart of a method for dropping a candidate channel according to an embodiment of the disclosure. As illustrated in FIG. 9, the method is performed by a network device, and the method includes the followings.

At step 901, bases on a channel dropping strategy adopted by a user equipment (UE), a blind detection object dropped by the UE is determined. The blind detection object dropped includes at least part of candidate channels and/or at least one control signaling whose detection is stopped on the at least part of candidate channels.

Optionally, the network device may send strategy indication information to the UE, in which the strategy indication information is configured to indicate the channel dropping strategy. Correspondingly, the UE may receive the strategy indication information from the network device, and determine the channel dropping strategy according to the strategy indication information. Further, the network device may determine the blind detection object dropped by the UE based on the channel dropping strategy adopted by the UE.

Optionally, the network device may determine the blind detection object dropped by the UE based on at least one channel dropping strategy in candidate channel dropping strategies pre-appointed with the UE.

In some embodiments of the disclosure, the strategy indication information includes at least one of the followings: a usage order of multiple channel dropping strategies; a priority of each channel dropping strategy; an effective time of each channel dropping strategy.

At step 902, a control signaling is sent to the UE based on the blind detection object dropped.

According to a method for dropping a candidate channel provided in the embodiment of the disclosure, the network device can determine a blind detection object dropped by the UE based on a channel dropping strategy adopted by the UE, in which the dropped blind detection object includes at least part of candidate channels and/or at least one control signaling whose detection is stopped on the at least part of candidate channels, and then the network device sends a control signaling to the UE based on the dropped blind detection object, so as to avoid unnecessary dropping of PDCCH candidates and unnecessary PDCCH blocking, thus improving a flexibility in a process of dropping the candidate channel, and at the same time preventing the network device from sending a DCI signaling to the dropped candidate channel, which may ensure a reliability in a scheduling process of the DCI signaling.

Corresponding to the methods for dropping a candidate channel provided in the above-mentioned embodiments, the disclosure also provides an apparatus for dropping a candidate channel Since the apparatus for dropping a candidate channel provided in the embodiment of the disclosure corresponds to the method for dropping a candidate channel provided in the above-mentioned embodiments, the implementation of the method for dropping a candidate channel is also applicable to the apparatus for dropping a candidate channel provided in the embodiment, which will not be described in detail in the embodiment. FIG. 10-FIG. 23 are schematic block diagrams of the apparatus for dropping a candidate channel according to the disclosure.

Figure 10:
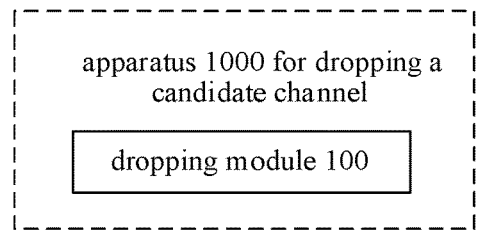
FIG. 10 is a block diagram of an apparatus for dropping a candidate channel applicable to a user equipment according to an embodiment of the disclosure.

FIG. 10 is a schematic block diagram of an apparatus for dropping a candidate channel according to an embodiment of the disclosure. As illustrated in FIG. 10, the apparatus 1000 for dropping a candidate channel is applied to the user equipment, and includes a dropping module 100.

The dropping module 100 is configured to drop at least part of candidate channels in one or more search spaces and/or stop detection of at least one control signaling on the at least part of candidate channels, in response to satisfying a limit condition on a blind detection number; in which the limit condition includes a first blind detection number for a current search space to be blindly detected being greater than a remaining maximum blind detection number; or a second blind detection number for one or more remaining search spaces to be blindly detected being greater than a remaining maximum blind detection number; or a third blind detection number for all search spaces configured on a current time slot being greater than a maximum blind detection number.

Figure 11:
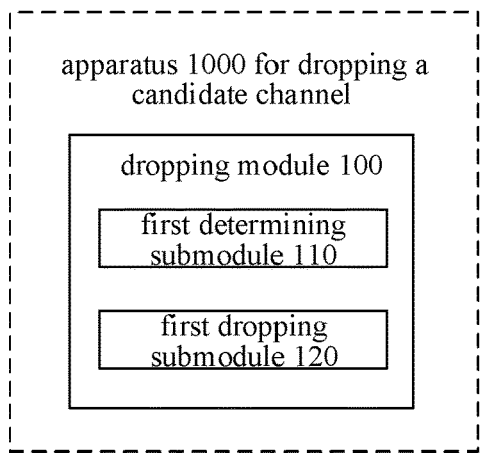
FIG. 11 is a block diagram of an apparatus for dropping a candidate channel according to another embodiment of the disclosure.

In some embodiments of the disclosure, as illustrated in FIG. 11, the dropping module 100 in FIG. 10 includes a first determining submodule 110 and a first dropping submodule 120.

The first determining submodule 110 is configured to determine, based on a type of the satisfied limit condition, one or more search spaces from the configured search spaces as one or more candidate search spaces.

The first dropping submodule 120 is configured to drop at least part of candidate channels in the one or more candidate search spaces and/or stop detection of at least one control signaling on the at least part of candidate channels.

Figure 12:
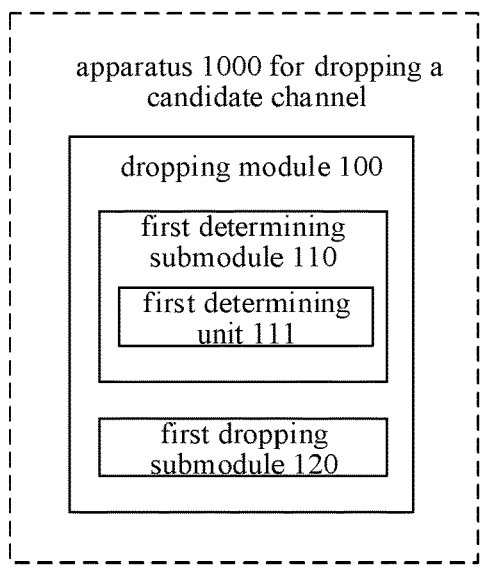
FIG. 12 is a block diagram of an apparatus for dropping a candidate channel according to another embodiment of the disclosure.

As illustrated in FIG. 12, the first determining submodule 110 in FIG. 11 includes a first determining unit 111.

The first determining unit 111 is configured to determine the current search space as the candidate search space in response to the satisfied limit condition indicating that the first blind detection number is greater than the remaining maximum blind detection number.

Figure 13:
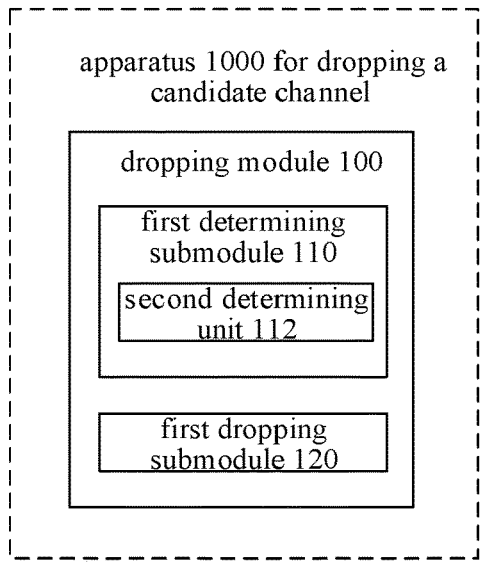
FIG. 13 is a block diagram of an apparatus for dropping a candidate channel according to another embodiment of the disclosure.

In some embodiments of the disclosure, as illustrated in FIG. 13, the first determining submodule 110 in FIG. 11 includes a second determining unit 112.

The second determining unit 112 is configured to determine the current search space and at least part of subsequent search spaces as the candidate search spaces in response to the satisfied limit condition indicating that the second blind detection number is greater than the remaining maximum blind detection number.

Figure 14:
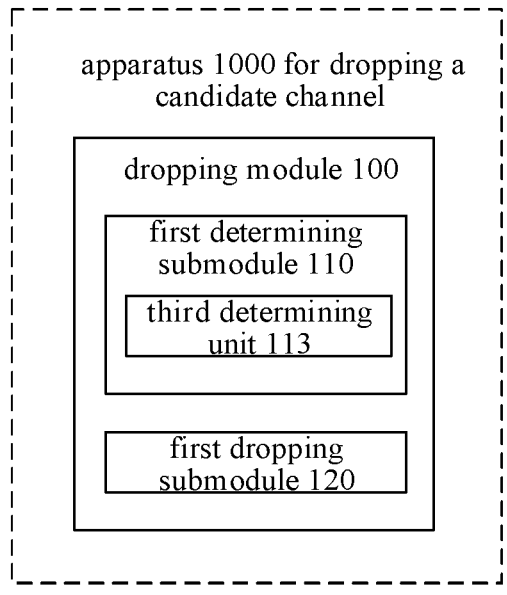
FIG. 14 is a block diagram of an apparatus for dropping a candidate channel according to another embodiment of the disclosure.

In some embodiments of the disclosure, as illustrated in FIG. 14, the first determining submodule 110 in FIG. 11 includes a third determining unit 113.

The third determining unit 113 is configured to determine at least part of one or more UE-specific search spaces (USSs) configured on the current time slot as the one or more candidate search spaces in response to the satisfied limit condition indicating that the third blind detection number is greater than the maximum blind detection number; or determine all the search spaces configured on the current time slot as the one or more candidate search spaces.

Figure 15:
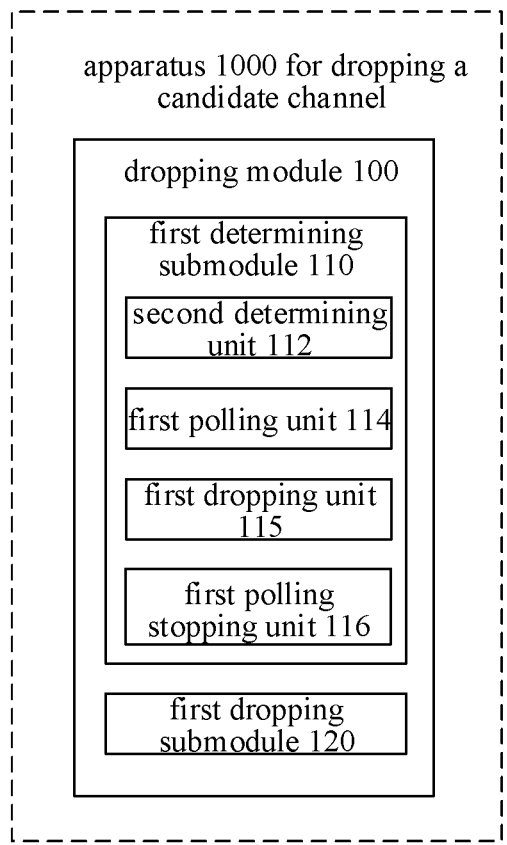
FIG. 15 is a block diagram of an apparatus for dropping a candidate channel according to another embodiment of the disclosure.
Figure 16:
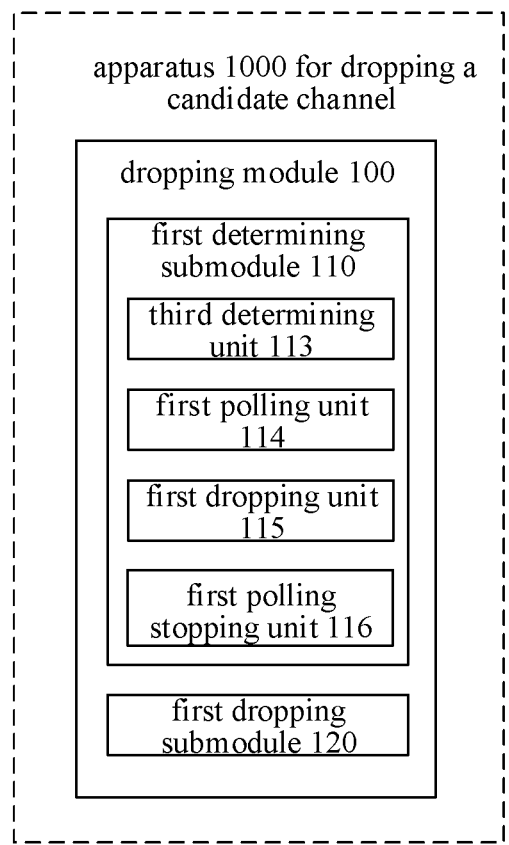
FIG. 16 is a block diagram of an apparatus for dropping a candidate channel according to another embodiment of the disclosure.

In some embodiments of the disclosure, as illustrated in FIG. 15 and FIG. 16, the first determining submodule 110 in FIG. 11 further includes a first polling unit 114, a first dropping unit 115 and a first polling stopping unit 116.

The first polling unit 114 is configured to poll a plurality of search spaces in the one or more candidate search spaces in a first order, in response to the one or more candidate search spaces including the plurality of search spaces.

The first dropping unit 115 is configured to, for a polled search space, drop at least part of candidate channels in the polled search space and/or stop detection of at least one control signaling on the at least part of candidate channels in the polled search space.

The first polling stopping unit 116 is configured to stop polling of one or more remaining search spaces in the one or more candidate search spaces, in response to satisfying a limit of the maximum blind detection number.

Figure 17:
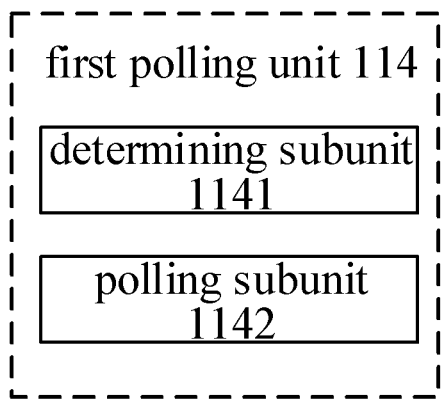
FIG. 17 is a block diagram of an apparatus for dropping a candidate channel according to another embodiment of the disclosure.

As illustrated in FIG. 17, the first polling unit 114 in FIG. 15 and FIG. 16 includes a determining subunit 1141 and a polling subunit 1142.

The determining subunit 1141 is configured to determine a starting search space for the polling from the one or more candidate search spaces.

The polling subunit 1142 is configured to poll the plurality of search spaces in the one or more candidate search spaces in the first order starting from the starting search space.

In some embodiments of the disclosure, the first order includes an order of serial numbers of the plurality of search spaces in the one or more candidate search spaces or an order of levels of the plurality of search spaces.

In some embodiments of the disclosure, the starting search space is one of: a search space with a level satisfying a preset condition; a configured first USS; or a configured first search space.

Figure 18:
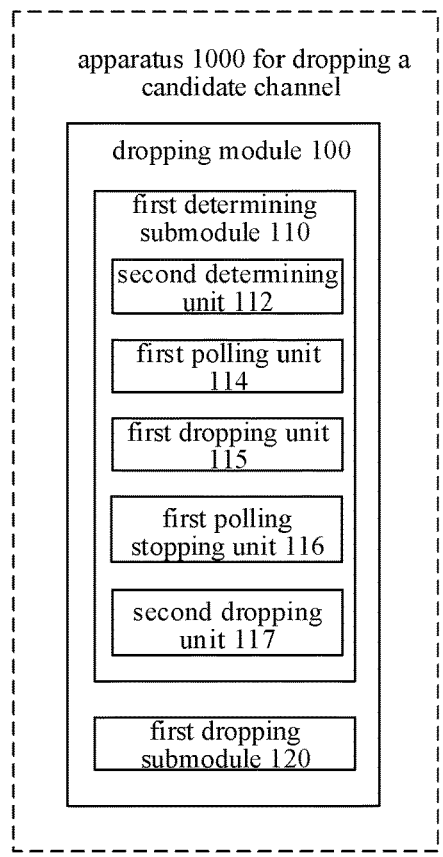
FIG. 18 is a block diagram of an apparatus for dropping a candidate channel according to another embodiment of the disclosure.
Figure 19:
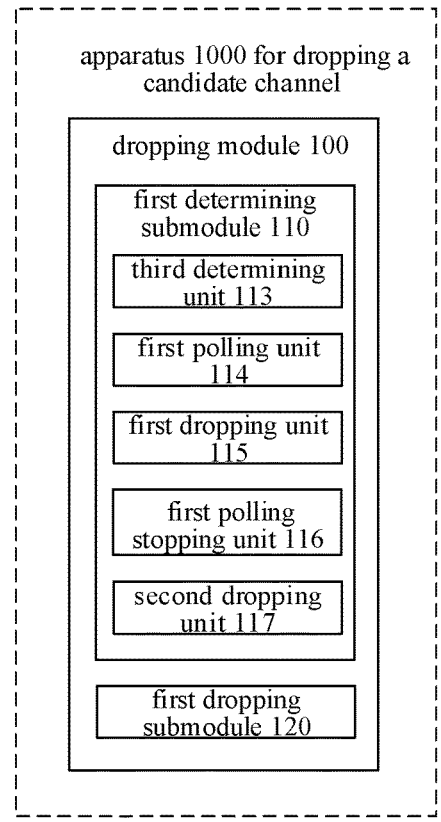
FIG. 19 is a block diagram of an apparatus for dropping a candidate channel according to another embodiment of the disclosure.

In some embodiments of the disclosure, as illustrated in FIG. 18 and FIG. 19, the first determining submodule 110 in FIG. 11 further includes a second dropping unit 117.

The second dropping unit 117 is configured to, in response to the one or more candidate search spaces including a plurality of search spaces, for each search space in the one or more candidate search spaces, drop at least part of candidate channels and/or stop detection of at least one control signaling on the at least part of candidate channels.

Figure 20:
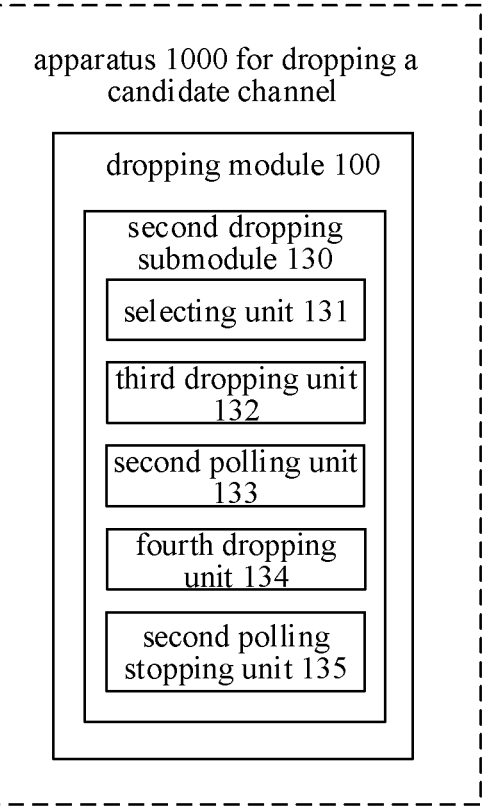
FIG. 20 is a block diagram of an apparatus for dropping a candidate channel according to another embodiment of the disclosure.

In some embodiments of the disclosure, as illustrated in FIG. 20, the dropping module 100 in FIG. 10 includes a second dropping submodule 130.

The second dropping submodule 130 is configured to drop at least part of candidate channels in the one or more candidate search spaces and/or stop detection of at least one control signaling on the at least part of candidate channels in the one or more candidate search spaces based on an aggregation level.

The second dropping submodule 130 includes a selecting unit 131, a third dropping unit 132, a second polling unit 133, a fourth dropping unit 134 and a second polling stopping unit 135.

The selecting unit 131 is configured to select an aggregation level satisfying a preset condition of the current search space as a target aggregation level.

The third dropping unit 132 is configured to drop at least part of candidate channels in the target aggregation level and/or stop detection of at least one control signaling on the at least part of candidate channels in the target aggregation level.

The second polling unit 133 is configured to poll aggregation levels of the one or more candidate search spaces in a second order.

The fourth dropping unit 134 is configured to, for a polled aggregation level, drop at least part of candidate channels in the polled aggregation level and/or stop detection of at least one control signaling on the at least part of candidate channels in the polled aggregation level.

The second polling stopping unit 135 is configured to stop polling of one or more remaining search spaces in the one or more candidate search spaces in response to satisfying a limit of the maximum blind detection number.

Figure 21:
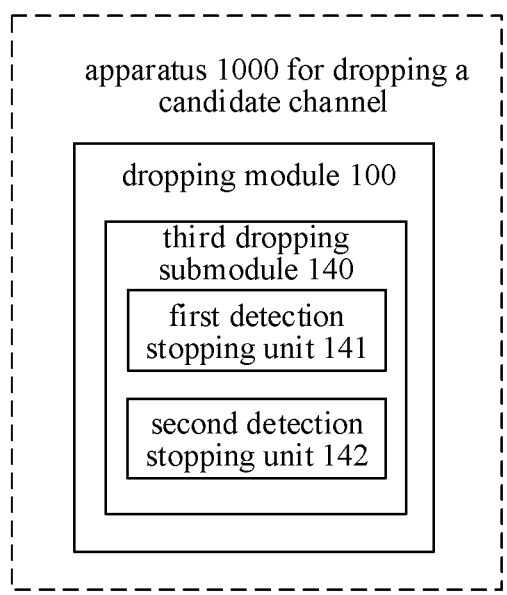
FIG. 21 is a block diagram of an apparatus for dropping a candidate channel according to another embodiment of the disclosure.

In some embodiments of the disclosure, as illustrated in FIG. 21, the dropping module 100 in FIG. 10 further includes a third dropping submodule 140, configured to, for each of aggregation levels of the one or more candidate search spaces, drop at least part of candidate channels and/or stop detection of at least one control signaling on the at least part of candidate channels.

In some embodiments of the disclosure, the at least part of candidate channels includes a first number of candidate channels, and different candidate search spaces correspond to a same first number or different first numbers.

In some embodiments of the disclosure, the at least part of candidate channels includes a second number of candidate channels, and different aggregation levels correspond to a same second number or different second numbers.

In some embodiments of the disclosure, the second dropping submodule 130 is further configured to select the second number of candidate channels in an order of serial numbers of candidate channels in the aggregation level, and drop the second number of candidate channels.

The third dropping submodule 140 includes a first detection stopping unit 141 or a second detection stopping unit 142.

The first detection stopping unit 141 is configured to stop detection of at least one control signaling carrying bits whose number is greater than a preset bit number on the at least part of candidate channels in the target aggregation level, in response to the target aggregation level being less than a first preset aggregation level.

The second detection stopping unit 142 is configured to stop detection of at least one control signaling carrying bits whose number is less than or equal to a preset bit number on the at least part of candidate channels in the target aggregation level, in response to the target aggregation level being greater than a second preset aggregation level.

Figure 22:
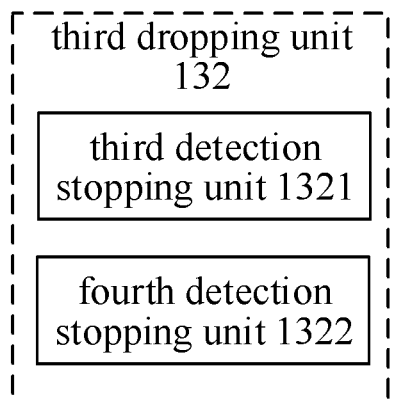
FIG. 22 is a block diagram of an apparatus for dropping a candidate channel according to another embodiment of the disclosure.

In some embodiments of the disclosure, as illustrated in FIG. 22, the third dropping unit 132 in FIG. 20 includes a third detection stopping unit 1321 or a fourth detection stopping unit 1322.

The third detection stopping unit 1321 is configured to stop detection of at least one downlink control signaling on the at least part of candidate channels in the target aggregation level, in response to the UE being a type of a device mainly responsible for uplink businesses.

The fourth detection stopping unit 1322 is configured to stop detection of at least one uplink control signaling on the at least part of candidate channels in the target aggregation level, in response to the UE being a type of a device mainly responsible for downlink businesses.

In some embodiments of the disclosure, a number of dropped candidate channels in a common search space (CSS) is less than a number of dropped candidate channels in a UE-specific search space (USS) and/or detection of at least one control signaling on candidate channels in the USS is stopped.

Figure 23:
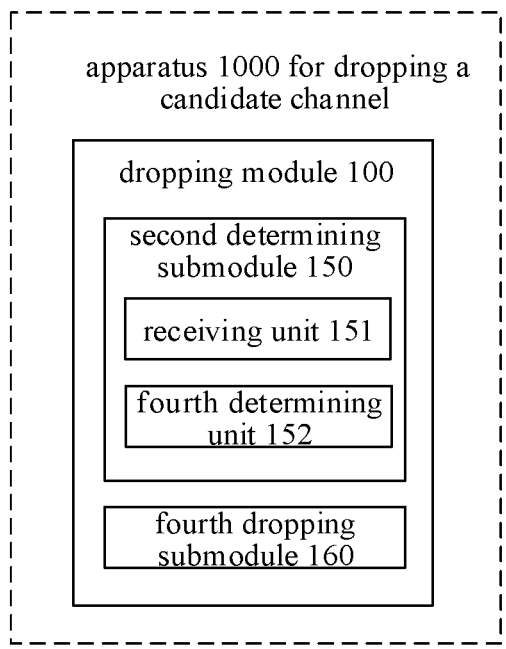
FIG. 23 is a block diagram of an apparatus for dropping a candidate channel according to another embodiment of the disclosure.

In some embodiments of the disclosure, as illustrated in FIG. 23, the dropping module 100 in FIG. 10 includes a second determining submodule 150 and a fourth dropping submodule 160.

The second determining submodule 150 is configured to determine a channel dropping strategy.

The fourth dropping submodule 160 is configured to drop the at least part of candidate channels in the one or more search spaces and/or stop detection of the at least one control signaling on the at least part of candidate channels based on the channel dropping strategy, in response to satisfying the limit condition.

The second determining submodule 150 includes a receiving unit 151 and a fourth determining unit 152.

The receiving unit 151 is configured to receive strategy indication information from a network device, and determine the channel dropping strategy based on the strategy indication information; or determine the channel dropping strategy as at least one of pre-appointed candidate channel dropping strategies.

The fourth determining unit 152 is configured to determine a usage order of a plurality of channel dropping strategies in response to the plurality of channel dropping strategies existing.

In some embodiments of the disclosure, the usage order is determined based on a priority of each channel dropping strategy and/or an effective time of each channel dropping strategy.

According to an apparatus for dropping a candidate channel provided in the embodiment of the disclosure, the user equipment can drop at least part of candidate channels in one or more search spaces and/or stop detection of at least one control signaling on the at least part of candidate channels in response to satisfying a limit condition on a blind detection number. The limit condition includes: a first blind detection number for a current search space to be blindly detected being greater than a remaining maximum blind detection number; or a second blind detection number for one or more remaining search spaces to be blindly detected being greater than a remaining maximum blind detection number; or a third blind detection number for all search spaces configured on a current time slot being greater than a maximum blind detection number. In this way, dropping of one or more candidate channels may be realized, and a channel dropping strategy of dropping all candidate channels in all remaining search spaces when the number of PDCCH candidates configured for the terminal device exceeds its maximum blind detection number is no longer used, thus avoiding unnecessary dropping of PDCCH candidates and unnecessary PDCCH blocking, and improving a flexibility in a process of dropping one or more candidate channels.

Figure 24:
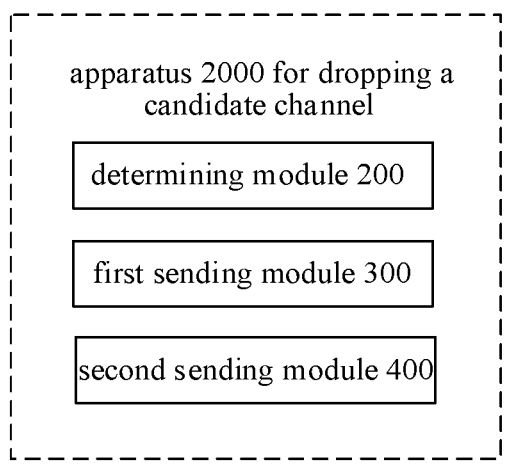
FIG. 24 is a block diagram of an apparatus for dropping a candidate channel applicable to a network device according to another embodiment of the disclosure.

FIG. 24 is a block diagram of an apparatus for dropping a candidate channel provided in an embodiment of the disclosure.

As illustrated in FIG. 24, the apparatus 2000 is applied in a network device, and includes a determining module 200 and a first sending module 300.

The determining module 200 is configured to determine a blind detection object dropped by a user equipment (UE) based on a channel dropping strategy adopted by the UE, in which the blind detection object dropped includes at least part of candidate channels and/or at least one control signaling whose detection is stopped on the at least part of candidate channels.

The first sending module 300 is configured to send a control signaling to the UE based on the blind detection object dropped.

In some embodiments of the disclosure, the apparatus 2000 further includes a second sending module 400.

The second sending module 400 is configured to send strategy indication information to the UE, in which the strategy indication information is configured to indicate the channel dropping strategy.

In some embodiments of the disclosure, the channel dropping strategy is at least one of candidate channel dropping strategies pre-appointed with the UE.

In some embodiments of the disclosure, the strategy indication information includes at least one of a usage order of a plurality of channel dropping strategies; a priority of each channel dropping strategy; and an effective time of each channel dropping strategy.

According to an apparatus for dropping a candidate channel provided in the embodiment of the disclosure, the network device can determine a blind detection object dropped by the UE based on a channel dropping strategy adopted by the UE, in which the dropped blind detection object includes at least part of candidate channels and/or at least one control signaling whose detection is stopped on the at least part of candidate channels, and then the network device sends a control signaling to the UE based on the dropped blind detection object, so as to avoid unnecessary dropping of PDCCH candidates and unnecessary PDCCH blocking, thus improving a flexibility in a process of dropping the candidate channel, and at the same time preventing the network device from sending a DCI signaling to the dropped candidate channel, which may ensure a reliability in a scheduling process of the DCI signaling.

Figure 25:
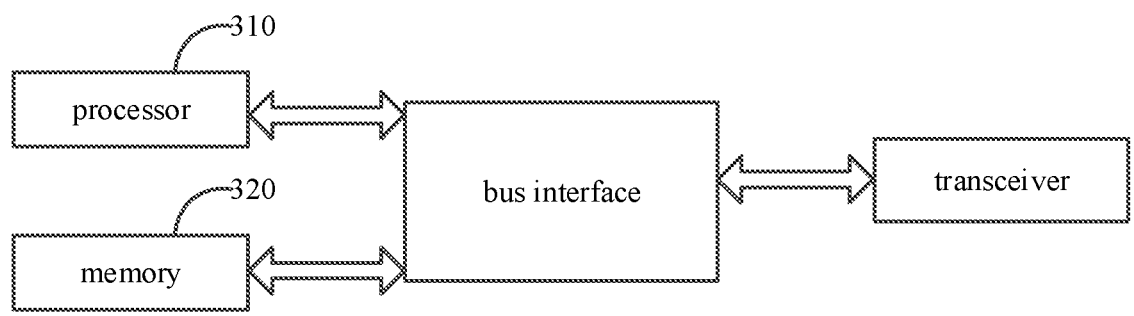
FIG. 25 is a block diagram of a user equipment according to an embodiment of the disclosure.

FIG. 25 is a block diagram of a user equipment provided in an embodiment of the disclosure. As illustrated in FIG. 25, the user equipment 3000 includes at least one processor 310; a memory 320 communicatively connected to the at least one processor 310; in which the memory 320 stores instructions executable by the at least one processor 310, the instructions are executed by the at least one processor 310 to cause the at least one processor 310 to perform the method described with reference to FIG. 1-FIG. 8.

Figure 26:
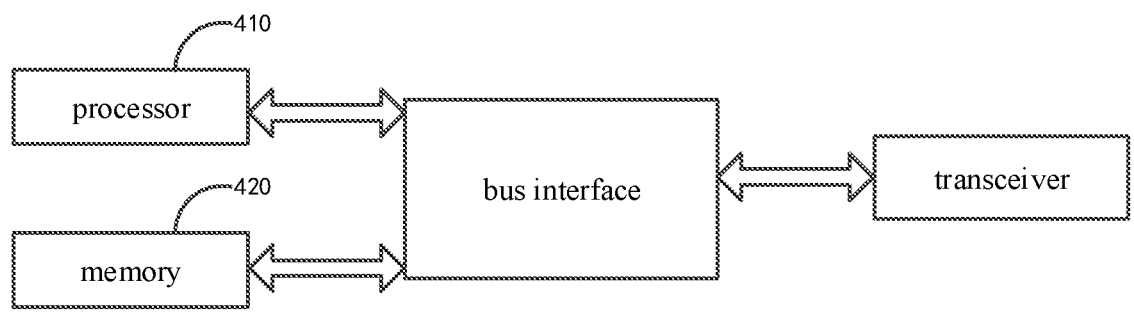
FIG. 26 is a block diagram of a network device according to an embodiment of the disclosure.

FIG. 26 is a block diagram of a user equipment provided in an embodiment of the disclosure. As illustrated in FIG. 26, the network device 4000 includes at least one processor 410; a memory 420 communicatively connected to the at least one processor 410; in which the memory 420 stores instructions executable by the at least one processor 410, the instructions are executed by the at least one processor 410 to cause the at least one processor 410 to perform the method described with reference to FIG. 9.

In some embodiments of the disclosure, a computer storage medium having computer-executable instructions stored thereon are provided. When computer-executable instructions are executed by a processor, the method described above is implemented.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The above-mentioned storage medium may be a read-only memory, a magnetic disc, an optical disc, etc.

The above only describes the preferred embodiments of the disclosure. It should be pointed out that for those skilled in the art, without departing from the principle of the disclosure, several improvements and modifications can be made. These improvements and modifications should be regarded as falling within the scope of the present disclosure.

What is claimed is:

1. A method for dropping a candidate channel, performed by a user equipment (UE), comprising:
    determining that a limit condition on a blind detection number is satisfied; wherein the limit condition comprises one of the following:
    a first blind detection number being greater than a remaining blind detection number, wherein the first blind detection number is a blind detection number of a next UE-specific search space to be blindly detected;
    a second blind detection number being greater than a remaining blind detection number, wherein the second blind detection number is a blind detection number of one or more remaining UE-specific search spaces to be blindly detected; or
    a third blind detection number being greater than a maximum blind detection number, wherein the third blind detection number is a blind detection number of all search spaces configured on a time slot; wherein, the search spaces comprise one or more UE-specific search spaces; and
    determining not to perform monitoring on one or more candidate channels, wherein the one or more candidate channels comprise a part of channels in the one or more UE-specific search spaces;
    the method further comprising:
    determining a plurality of search spaces;
    performing monitoring on the plurality of search spaces in a first order; and
    performing monitoring on a next search space in response to determining that the limit condition is not satisfied.

2. The method according to claim 1, wherein determining not to perform monitoring on the one or more candidate channels comprises at least one of:
    dropping at least part of candidate channels in the one or more UE-specific search spaces;
    stopping detection of at least one control signaling on the at least part of candidate channels in the one or more UE-specific search spaces;
    stopping detection of at least one control signaling on the at least part of candidate channels in the search spaces.

3. The method according to claim 1, further comprising:
    determining a plurality of search spaces;
    performing monitoring on the plurality of search spaces in a first order;
    wherein determining that the limit condition is satisfied comprises:
    determining that the limit condition is satisfied after performing the monitoring on a first search space and before performing the monitoring on a second search space, wherein the one or more candidate channels comprises a part or all of candidate channels in the second search space.

4. The method according to claim 1, wherein determining that the limit condition is not satisfied comprises:
    determining a blind detection number of the next search space; and
    determining that the limit condition is not satisfied based on the blind detection number of the next search space.

5. The method according to claim 1, wherein the candidate channel is a physical downlink control channel (PDCCH).

6. The method according to claim 1, wherein the third blind detection number is 44 or 22.

7. The method according to claim 1, wherein a number of candidate channels in one search space is related to an aggregation level of the search space.

8. A user equipment, comprising:
    at least one processor;
    a memory communicatively connected to the at least one processor;
    wherein, the memory stores instructions executable by the at least one processor, the instructions are executed by the at least one processor to cause the at least one processor to perform the following:
    determining that a limit condition on a blind detection number is satisfied; wherein the limit condition comprises one of the following: a first blind detection number being greater than a remaining blind detection number, wherein the first blind detection number is a blind detection number of a next UE-specific search space to be blindly detected; a second blind detection number being greater than a remaining blind detection number, wherein the second blind detection number is a blind detection number of one or more remaining UE-specific search spaces to be blindly detected; or a third blind detection number being greater than a maximum blind detection number, wherein the third blind detection number is a blind detection number of all search spaces configured on a time slot; wherein, the search spaces comprise one or more UE-specific search spaces; and
    determining not to perform monitoring on one or more candidate channels, wherein the one or more candidate channels comprise a part of channels in the one or more UE-specific search spaces;
    wherein the instructions are executed by the at least one processor to cause the at least one processor to further perform the following:
    determining a plurality of search spaces;
    performing monitoring on the plurality of search spaces in a first order; and
    performing monitoring on a next search space in response to determining that the limit condition is not satisfied.

9. The user equipment according to claim 8, wherein the instructions are executed by the at least one processor to cause the at least one processor to further perform the following:
    determining a plurality of search spaces;
    performing monitoring on the plurality of search spaces in a first order;
    wherein determining that the limit condition is satisfied comprises:
    determining that the limit condition is satisfied after performing the monitoring on a first search space and before performing the monitoring on a second search space, wherein the one or more candidate channels comprises a part or all of candidate channels in the second search space.

10. The user equipment according to claim 8, wherein determining that the limit condition is not satisfied comprises:
   determining a blind detection number of the next search space; and
   determining that the limit condition is not satisfied based on the blind detection number of the next search space.

11. The user equipment according to claim 8, wherein the candidate channel is a physical downlink control channel (PDCCH).

12. The user equipment according to claim 8, wherein the third blind detection number is 44 or 22.

13. The user equipment according to claim 8, wherein a number of candidate channels in one search space is related to an aggregation level of the search space.

14. The user equipment according to claim 8, wherein determining not to perform monitoring on the one or more candidate channels comprises at least one of:
   dropping at least part of candidate channels in the one or more UE-specific search spaces;
   stopping detection of at least one control signaling on the at least part of candidate channels in the one or more UE-specific search spaces; and
   stopping detection of at least one control signaling on the at least part of candidate channels in the search spaces.

15. A non-transitory computer storage medium having computer-executable instructions stored thereon, wherein after the computer-executable instructions are executed by a processor, the processor is caused to perform the following:
   determining that a limit condition on a blind detection number is satisfied; wherein the limit condition comprises one of the following: a first blind detection number being greater than a remaining blind detection number, wherein the first blind detection number is a blind detection number of a next UE-specific search space to be blindly detected; a second blind detection number being greater than a remaining blind detection number, wherein the second blind detection number is a blind detection number of one or more remaining UE-specific search spaces to be blindly detected; or a third blind detection number being greater than a maximum blind detection number, wherein the third blind detection number is a blind detection number of all search spaces configured on a time slot; wherein, the search spaces comprise one or more UE-specific search spaces; and
   determining not to perform monitoring on one or more candidate channels, wherein the one or more candidate channels comprise a part of channels in the one or more UE-specific search spaces;
   wherein the processor is caused to further perform the following:
   determining a plurality of search spaces;
   performing monitoring on the plurality of search spaces in a first order; and
   performing monitoring on a next search space in response to determining that the limit condition is not satisfied.

16. The non-transitory computer storage medium according to claim 15, wherein determining not to perform monitoring on the one or more candidate channels comprises at least one of:
   dropping at least part of candidate channels in the one or more UE-specific search spaces;
   stopping detection of at least one control signaling on the at least part of candidate channels in the one or more UE-specific search spaces; and
   stopping detection of at least one control signaling on the at least part of candidate channels in the search spaces.

17. The non-transitory computer storage medium according to claim 15, wherein the processor is caused to further perform the following:
   determining a plurality of search spaces;
   performing monitoring on the plurality of search spaces in a first order;
   wherein determining that the limit condition is satisfied comprises:
   determining that the limit condition is satisfied after performing the monitoring on a first search space and before performing the monitoring on a second search space, wherein the one or more candidate channels comprises a part or all of candidate channels in the second search space.

* * * * *